United States Patent
Fuzesi et al.

[15] 3,674,717
[45] July 4, 1972

[54] POLYURETHANE FOAMS PREPARED FROM OXYETHYLATED STARCH-PHOSPHORUS-CONTAINING POLYETHERS

[72] Inventors: Stephen Fuzesi, Hamden; Milton Lapkin, Barrington, both of R.I.

[73] Assignee: Olin Corporation

[22] Filed: Oct. 5, 1970

[21] Appl. No.: 78,193

Related U.S. Application Data

[60] Continuation-in-part of Ser. No. 735,930, Feb. 20, 1968, abandoned, which is a division of Ser. No. 457,814, May 21, 1965, Pat. No. 3,399,190.

[52] U.S. Cl............260/2.5 AS, 260/2.5 AR, 260/2.5 AK, 260/DIG. 24
[51] Int. Cl. ....................................C08g 22/14, C08g 22/46
[58] Field of Search..................260/2.5 AR, 2.5 AS, 77.5 AS

[56] References Cited

UNITED STATES PATENTS

| | | | |
|---|---|---|---|
| 3,350,389 | 10/1967 | Patton et al | 260/234 |
| 3,466,252 | 9/1969 | Prahl et al | 260/2.5 |
| 3,251,828 | 5/1966 | Lutz | 260/234 |

FOREIGN PATENTS OR APPLICATIONS 954,792  4/1964  Great Britain...........260/77.5 AR UX

OTHER PUBLICATIONS

Saunders et al. Polyurethanes, Part II, Interscience, New York (1964) pages 67–69, 197–200. Call No. TP986P6S3

*Primary Examiner*—Donald E. Czaja
*Assistant Examiner*—H. S. Cockeram
*Attorney*—Donald F. Clements, Gordon D. Byrkit, F. A. Iskander, Eugene Zagarella, Jr. and Thomas P. O'Day

[57] ABSTRACT

Flame-retardant polyurethane foams having open cells are prepared from a polyether polyol, an organic polyisocyanate, a foaming agent and a catalyst, wherein the polyether polyol is oxyethylated starch-phosphorus-containing polyether.

6 Claims, No Drawings

POLYURETHANE FOAMS PREPARED FROM OXYETHYLATED STARCH-PHOSPHORUS-CONTAINING POLYETHERS

The present application is a continuation-in-part of copending application Ser. No. 735,930, filed Feb. 20, 1968 and now abandoned, which was a division of application Ser. No. 457,814, filed May 21, 1965, now U.S. Pat. No. 3,399,190, which issued Aug. 27, 1968.

This invention relates to polyurethane foam prepared from starch-phosphorus-based polyhydroxy-polyoxy-ethylene ethers.

Polyurethane foams have been used in the preparation of structural panels, insulation, cushions, pillows, mattresses, and the like. Generally these foams are prepared by reacting an organic polyisocyanate with a polyol in the presence of a foaming agent and a catalyst. Extensive efforts have been made to reduce the cost of preparing these foams. Because of the low cost of starch, efforts have been made to employ starch as a polyol reactant in the preparation of urethane foams. The use of starch directly has been unsatisfactory because of the poor physical properties of the foam which results. Oxyalkylated starch yields satisfactory foams, but the direct oxyalkylation of starch results in degradation or decomposition of the starch and a product which is not uniform in chemical or physical properties.

A satisfactory process for utilizing starch as a component in the preparation of polyurethane foams is disclosed in U.S. Pat. No. 3,277,213, issued Oct. 4, 1966, to Stephen Fuzesi. In this process starch is added to a polyhydric alcohol containing at least two hydroxyl groups in a proportion equivalent to at least 0.5 mole of the alcohol per mole of glucose unit weight of starch in the presence of an acid catalyst. The resulting reaction mixture is then oxyalkylated to yield a polyether polyol suitable for use in preparing polyurethane foams of excellent physical properties. Although a substantial proportion of the polyether polyol is based upon starch, a significant proportion of the polyether is still formed from the relatively expensive alcohol. Increasing the proportion of starch in such a polyether increases the functionality of the system and lowers the cost of the polyether. As a result, the properties of the resulting urethane foams are improved and the cost of preparing the urethane foam therefrom is reduced. An effective technique for increasing the proportion of starch in polyethers is disclosed in U.S. Pat. No. 3,402,170, issued Sept. 17, 1968, to Stephen Fuzesi and Leonard J. Klahs.

Although these techniques result in low-cost, starch-based polyethers, the urethane foams prepared from these polyethers do not always have desirable flame retarding properties. Although it is generally recognized that the presence of high proportions of nitrogen, phosphorus, and/or chlorine atoms enhances the flame resistance of urethane foams, present techniques for adding these components to urethane foams are not entirely satisfactory. There is a great need at the present time for low-cost polyethers capable of producing a polyurethane foam which is substantially flame resistant and which has good humid aging properties.

In addition, there are several instances in which flame retardant open-cell rigid polyurethane foams are desired. For example, sound insulating construction panels and high temperature filter mediums call for this type of foam. Conventional rigid polyurethane foams generally are closed-cell foams, wherein more than 50 percent of the cells do not have any open membranes. There is a need at the present time for the development of flame retardant open-cell rigid foam.

It is a primary object of this invention to overcome the disadvantages inherent in previously known techniques employed in the preparation of polyurethane foams.

A further object of the invention is to provide an improved polyurethane foam.

It is another object of the invention to provide a polyurethane foam having flame retarding properties.

Still another object of the invention is to provide a polyurethane foam having good humid aging properties.

A further object of the invention is to provide a rigid polyurethane foam having open cells.

These and other objects of the invention will be apparent from the following detailed description thereof.

It has now been discovered that the objects of this invention are accomplished by admixing starch with phosphoric acid at an elevated temperature and oxyethylating the resulting mixture to yield a starch-phosphorus-based polyether useful as a reactant in the preparation of urethane foams having satisfactory flame retarding properties. In another embodiment of the invention a polyhydric alcohol is admixed with hydrolyzed starch, and the resulting mixture, with or without prior oxyethylation, is admixed with phosphoric acid and this mixture is then oxyethylated to yield a starch-phosphorus-based polyether. The resulting oxyethylated polyether is also useful as a reactant in the preparation of urethane foams having satisfactory flame retarding properties.

The starch-phosphorus-based polyether used to prepare polyurethane foams of this invention may be prepared from any starch, i.e., any compound having a formula $(C_6H_{10}O_5)_x$. These compounds are carbohydrates or polysaccharides which occur naturally in many plant cells. Typical starches which may conveniently be employed include potato starch, corn starch, chlorinated starches, rice starch, tapioca starch, wheat starch, mixtures thereof and the like. From an economic standpoint, potato starch and corn starch are preferred. The starch may be in anhydrous form or in the wet stage, for example, containing as high as about 20% by weight of water.

Any available phosphoric acid may be employed in preparing the polyethers used to prepare the polyurethane foams of this invention. From the standpoint of economics, availability, and ease of handling, the preferred phosphoric acids include, but are not limited to, phosphoric acids containing between about 80 and about 120% $H_3PO_4$ by weight. Commercially available grades presently available having concentrations within this range include 85% phosphoric acid, 100% phosphoric acid, 105% phosphoric acid containing about 76% $P_2O_5$, 115% phosphoric acid containing about 84% $P_2O_5$, phosphorus anhydride containing 100% $P_2O_5$, and the mixtures thereof.

Ethylene oxide is employed in preparing the starch-phosphorus-based polyether component of the polyurethane foams of the present invention. Other alkylene oxides such as propylene oxide, butylene oxide and the like may be present with the ethylene oxide, either as a mixture or block addition to the polyether in an amount up to about 50% of the total alkylene oxide used to prepare the polyether. However, addition of these other alkylene oxides increases the proportion of closed cells in the rigid foams.

No catalyst is necessary to effect the reaction between the starch, phosphoric acid, and ethylene, since the phosphoric acid reactant generally acts as a catalyst. However, if it is desired to prepare higher molecular weight polyethers with lower hydroxyl numbers, other catalytic substances may be added to the reaction mass. The acid catalyst may be any inorganic or Lewis acid catalyst. The preferred Lewis acid is boron trifluoride. Other representative Lewis acid catalysts include, but are not limited to, boron trichloride, aluminum chloride, titanium chloride, tin tetrachloride, ferric chloride, and acidic clays, such as Tonsil clay. Other suitable acid catalysts include inorganic acids such as sulfuric acid, hydrochloric acid, hydrofluoric acid, nitric acid and the like.

In one embodiment of the invention a polyhydric alcohol is added to the starch and phosphoric acid prior to the oxyethylation. In this embodiment any polyhydric alcohol containing at least two hydroxyl groups may be employed in the preparation of starch-based polyethers used to prepare the novel foams of this invention. It is preferred to employ glycerol, ethylene glycol, propylene glycol, sorbitol and the like due to the availability and ease of reaction. However, polyhydric alcohols which may be conveniently employed include, but are not limited to, pentaerythritol, hexanetriol, sucrose, trimethylol propane, trimethylol ethane, 1,2-butanediol, diethylene glycol, triethylene glycol, 2-butene-1,4-diol, 2-butyne-1,4-diol, 3-chloro-1,2-propanediol, 2-chloro-1,3-propanediol, mixtures thereof and the like.

Various procedures may be employed in preparing polyethers used to prepare the novel foams of this invention. In one embodiment starch is added to sufficient phosphoric acid to maintain the reaction mass in a fluid state under the temperature and pressure conditions employed. If desired, the starch may be added in one or more increments until all of the starch requirements have been added. The ethylene oxide is then added to the mixture of starch and phosphoric acid in a proportion to obtain the desired degree of oxyethylation. In another embodiment a polyhydric alcohol is admixed with hydrolyzed starch, with or without prior oxyethylation, and the resulting mixture is further admixed with phosphoric acid and then oxyethylated. In still another embodiment, phosphoric acid is preoxyethylated to a desired degree and then admixed with the starch to obtain the novel starch-phosphorus-based polyether used to prepare the polyurethane foams of this invention.

The proportion of reactants is not critical, provided the proportion of unreacted starch in the reaction mass does not exceed the amount necessary to maintain the reaction mass in a fluid state. The proportion of phosphoric acid is generally equivalent to a $P_2O_5$ molar concentration in the range between about 1 and about 10, and preferably in the range between about 1.5 and about 3 moles of $P_2O_5$ per glucose unit weight of starch. Larger proportions of phosphoric acid may be employed, if desired. The proportion of phosphoric acid can be decreased below a molar ratio of $P_2O_5$ to glucose unit weight of starch of 0.5 to 1 when a suitable solvent is employed in carrying out the reaction.

Each glucose unit weight of starch is equivalent to 162 grams of starch on an anhydrous basis. Normally, each glucose unit weight of starch contains water associated therewith. In a preferred embodiment of the present invention, a small amount of water, preferably no more than about 2 moles or 36 grams, per glucose unit weight of starch, is added with the starch or with the phosphoric acids. However, smaller or larger proportions of water may be present if desired.

The proportion of ethylene oxide which may be added to the reactants is only limited by the amount of free acid and/or catalyst that may be present. The mixture formed by mixing starch and phosphoric acid, as described above, contains hydroxyl radicals provided by the phosphoric acid which are available to react with the ethylene oxide. In addition, hydroxyl radicals are provided by the glucose, alcohol and water if present, which are available to react with the ethylene oxide as long as there is free acid and/or catalyst present in the system. Thus, the minimum amount of ethylene oxide which will react with the mixture formed by admixing starch and phosphoric acid is approximately equivalent to 1 mole of ethylene oxide per hydroxyl radical present as phosphoric acid. However, the proportion of alkylene oxide usually added is between about 0.5 and about 45 moles of ethylene oxide per hydroxyl radical present in the system, including hydroxyl radicals provided by the phosphoric acid, glucose, water, starch and any other source of hydroxyl radical present in the system. For example when ethylene oxide is employed to prepare a polyether having a hydroxyl number between about 300 and 800 for use in the preparation of rigid polyurethane foams, the proportion of ethylene oxide ranges from between about 0.9 to about 3.5 moles per hydroxyl radical present in the system. Similarly, when a polyether having a hydroxyl number between about 100 and 300, which is useful in the preparation of semi-rigid foams, is desired, the ethylene oxide proportion ranges from about 3.5 to about 12 moles per hydroxyl radical present in the system. If a polyether having a hydroxyl number ranging from about 30 to 100, which is useful in the preparation of flexible polyurethane foams, is desired, the proportion of ethylene oxide will range from about 12 moles to about 42 moles per hydroxyl radical present in the system.

When a polyhydric alcohol is employed, the proportion is generally in the range between about 0.2 and 4 and preferably in the range between about 0.2 and about 1.0 moles of alcohol per glucose unit weight of starch.

When an additional catalyst, other than phosphoric acid, is employed, the proportion of catalyst added is at least about 0.05 percent and preferably between about 0.1 and about 2 percent of the combined weight of reactants.

The reaction between the starch, phosphoric acid and ethylene oxide, and polyol, if employed, is accelerated by employing elevated temperatures, i.e., preferably in the range between about 30° and about 120° C. Temperatures over 120° C. may be employed but decomposition occurs at temperatures higher than this during the early stages of oxyethylation. The specific temperature of the reaction will vary depending on the degree of completion, reactants employed, time of reaction, pressure and other reaction conditions. Similarly, the reaction time will vary depending upon the temperature of the reaction, reactants employed and amounts thereof.

In a preferred procedure for carrying out the process of the present invention, a portion of the starch requirements is slowly added to the phosphoric acid at room temperature while retaining the reactants in a fluid state. An additional portion of starch is added at a temperature between about 60° and about 120° C., keeping the system constantly fluid. After the starch requirements have been added the reaction mixture may, if desired, be maintained at this elevated temperature for at least about 5 minutes and generally for not more than an hour prior to oxyethylation. When a polyhydric alcohol is employed as a reactant, it is preferred to add the phosphoric acid to the reaction mixture of starch and alcohol.

While it is not desired to be bound by theory, it is believed that the starch will degrade in the presence of water and phosphoric acid forming glucose, and some glucose will react with the phosphoric acids, mainly with the polyphosphoric acids, forming glucose dihydrogen phosphates. Oxyethylation may then be conducted with or without separating any excess water present. When the water is not removed, the water will be oxyethylated and will produce an oxyethylated diol as a constituent of the starch-phosphorus-based polyether. The resulting lower boiling diols may or may not be removed from the system prior to reacting with the organic isocyanate to form the polyurethane foam. Separation of the lower boiling diols depends upon the ultimate use of the starch-phosphorus-based polyether, since the presence of the lower boiling diols may be advantageous in the preparation of certain polyurethane foams.

In another embodiment of the initial step of this invention, a mixture of starch and water containing a proportion of water in excess of that necessary to hydrolyze the starch is reacted with the ethylene oxide to form in situ the corresponding glycol, thus providing all or part of the polyhydric alcohol requirements for the initial step.

After reaction of the starch, water, and phosphoric acid in the initial step has been completed and separation of the water has been or has not been made, as the case may be, oxyethylation of the degraded starch-phosphoric acid mixture is effected by adding ethylene oxide thereto while maintaining the temperature in the range between about 30° and 120° C. The lower temperatures are preferably employed during the reaction with the ethylene oxide, since this reaction is exothermic. The period of addition of the ethylene oxide will vary with the degree of oxyethylation desired.

When it is desired to prepare a polyether having a relatively high starch-to-phosphoric acid ratio, the starch is added to the reaction mass in two or more increments. For example, a small increment is added to the total phosphoric acid requirements followed by sufficient ethylene oxide to oxyethylate the proportion of starch added to the reaction mass. A second increment of starch is added to the resulting reaction mass followed by the addition of a second portion of ethylene oxide. This incremental addition of starch followed by incremental addition of ethylene oxide may be repeated until the desired ratio of starch to phosphoric acid is obtained and then sufficient ethylene oxide is added to yield a starch-phosphorus-based polyether having a hydroxyl number in the desired range.

The resulting reaction product prepared by any of the aforesaid embodiments is purified by distilling off volatiles such as unreacted ethylene oxide and undesired low boiling by-products under vacuum at a suitable temperature, for example, in the range between about 60° and about 100° C. The resulting product has a pH between about 4.5 and about 5.5, and may be used to prepare urethane foams without any further treatment. However, if a polyether having a higher pH is required, an inorganic base (NaOH, KOH, CaOH, for example) or organic base (triethanolamine, triethyl amine, trimethyl amine, for example) may be employed to raise the pH to the desired level. Triethanolamine is preferably employed for this purpose. Filtration or other solid-liquid separation technique may be employed, if desired, to separate any solids that may be present, but this separation step is not necessary.

Starch-phosphorus-based polyhydroxy-polyoxyethylene ethers prepared in accordance with this process have a relatively low viscosity and excellent physical properties which make them suitable for use in the preparation of polyurethane foams. When these starch-based polyethers are employed in the preparation of rigid polyurethane foams, the hydroxyl number of the polyether should be in the range between 300 and about 800. In the preparation of semi-rigid polyurethane foams, the hydroxyl number of the starch-based polyether should be in the range between about 100 and about 300. In the preparation of flexible polyurethane foams, the hydroxyl number of the starch-based polyether should be between about 30 and about 100.

In the preparation of polyurethane foams from the starch-phosphorus-based polyethers, either the so-called "one shot method" or the "semiprepolymer technique" ("quasi-prepolymer technique") may be employed.

Any organic polyisocyanate may be employed in the preparation of the polyurethane foams, including diisocyanates, triisocyanates, and polyisocyanates. Organic polyisocyanates are preferred due to commercial availability, especially polymethylene polyisocyanates (PAPI), polymers of 2,4- and 2,6-toluene diisocyanate, and the like. Other typical exemplificative isocyanates include, but are not limited to, the following: methylene-bis-(4-phenyl isocyanate), 3,3'-dimethoxy-4,4'-biphenylene diisocyanate, naphthalene-1,5-diisocyanate, hexamethylene diisocyanate, 2,4- and 2,6-toluene isocyanates, and mixtures thereof, either in their pure or crude form, the latter form usually containing polymers of the specified isocyanates. The amount of isocyanate employed in the preparation of the polyurethane foams should be sufficient to provide at least 0.7 NCO groups per hydroxyl group present in the starch-phosphorus-based polyether of the present invention, the number of hydroxyl groups in any additive employed and the number of hydroxyl groups employed in the blowing agent. An excess of isocyanate compound may be conveniently employed; however, this is generally undesirable due to the high cost of the isocyanate compounds. It is preferable, therefore, to employ no greater than 1.25 NCO groups per hydroxyl group, and preferably between about 0.8 and about 1.15 NCO groups.

The polyurethane foams are prepared in the presence of a foaming agent and a reaction catalyst. The foaming agent employed may be any of those known to be useful for this purpose, such as water, the halogenated hydrocarbons and mixtures thereof. Typical halogenated hydrocarbons include, but are not limited to, the following: monofluorotrichloromethane, difluorodichloromethane, 1,1,2-trichloro-1,2,2-trifluoroethane, methylene chloride, chloroform, carbon tetrachloride, and mixtures thereof. The amount of blowing agent employed may be varied within a wide range. Generally, however, the halogenated hydrocarbons are employed in an amount from 1 to 50 parts by weight per 100 parts by weight of the starch-phosphorus-based polyether of the present invention, and generally the water is employed in an amount of from 0.1 to 10 parts by weight per 100 parts by weight of the starch-phosphorus-based polyether of the present invention.

The polyurethane foams are prepared in the presence of a catalytic amount of a reaction catalyst. The catalyst employed may be any of the catalysts known to be useful for this purpose, including tertiary amines and metallic salts. Typical tertiary amines include, but are not limited to, the following: N-methyl morpholine, N-hydroxyethyl morpholine, triethylene diamine, triethylamine, trimethylamine and mixtures thereof. Typical metallic salts include, for example, the salts of antimony, tin and iron, e.g., dibutyltin dilaurate, stannous octoate, etc. and mixtures thereof. Generally speaking, the catalyst is employed in an amount from 0.1 to 2.0 percent by weight based on the starch-phosphorus-based polyether of the present invention.

The polyurethane foams of the present invention may be prepared directly from the reaction between the starch-phosphorus-based polyether and organic polyisocyanate in the presence of a foaming agent and reaction catalyst. Optionally, various additives may be employed in the preparation of the polyurethane foams in order to achieve particular properties. Exemplificative of such additives include, but are not limited to the following: monocarboxylic acids, polycarboxylic acids, polyesters, monohydroxy compounds, polyhydroxy compounds, etc.

Some of the starch-phosphorus-based polyethers employed in the present invention are characterized by a high room temperature viscosity. In these cases in order to prepare the polyurethane foam it will be necessary to apply heat in order to reduce the viscosity or to admix therewith a material of lower viscosity. This may be conveniently accomplished by admixing a lower viscosity starch-phosphorus-based polyether with the higher viscosity starch-phosphorus-based polyether.

It is preferred in the preparation of the polyurethane compounds of the present invention to employ minor amounts of a surfactant in order to improve the cell structure of the polyurethane foam. Typical of such surfactants are the silicone oils, and soaps. Generally up to 2 parts by weight of the surfactant is employed per 100 parts of starch-phosphorus-based polyether.

Various additives can be employed which serve to provide different properties, e.g., fillers, such as clay, calcium sulfate, or ammonium phosphate may be added to lower cost and improve physical properties. Ingredients such as dyes may be added for color, and fibrous glass, asbestos, or synthetic fibers may be added for strength. In addition, plasticizers, deodorants and anti-oxidants may be added.

Polyurethane foams of this invention may also be used as wall panels, padding, cushions and the like. However, the open-cell rigid foams also may be used as a filter medium, particularly in high temperature operation, as sound insulation panels, as a support for cut flowers in floral arrangement, and the like.

The process of the present invention will be more readily apparent from a consideration of the following illustrative examples. In the following examples the starch which was employed contained associated therewith about 10 to 15% by weight of water. All parts and percentages are by weight unless indicated otherwise.

EXAMPLES 1-4

A jacketed, agitated 316 stainless steel reactor having a capacity of 100 gallons was used to prepare the starch-phosphorus-based polyether. After a vacuum purge of the reactor, a charge of 22.2 lbs. of 85% phosphoric acid and 91.7 lbs. of 105% phosphoric acid was added to the reactor under a nitrogen purge. The reactor was closed and the contents were heated to about 50° C.

The reactor was reopened under a nitrogen purge, and 52.8 lbs. of corn starch was gradually added, while agitating the reactor contents. The reactor was closed and the contents were heated to 90° C. The reactor was reopened under a nitrogen purge, and an additional charge of 52.7 lbs. of corn starch was gradually added to the reactor contents.

The reactor contents were heated to a temperature of about 90° C. until the iodine test indicated the absence of unhydrolyzed starch. This occurred about 2 hours after the addition of the second charge of starch.

Ethylene oxide was added to the reactor contents as rapidly as possible while maintaining the reaction temperature in the range between about 85° and 99° C. The reaction pressure increased to a maximum of 42 lbs. per square inch. During a period of 23 hours, a total of 650 lbs. of ethylene oxide was added to the reactor contents.

After completion of the addition of ethylene oxide, the reactor contents were maintained at a temperature of about 90°–92 C. for a period of one hour. Completion of the addition of ethylene oxide was determined by analyzing the acid number of a sample of the reactor contents, and when the acid number reached 0.37, ethylene oxide addition was stopped.

At the end of the post reaction period, the volatiles were stripped from the reactor at a temperature of about 85°–90° C., a pressure of 100 mm. Hg., for a period of 3 hours.

The resulting product was filtered on a Cuno filter at 80°–85° C. to remove sediment. Analysis of the resulting polyether showed the following:

| Analysis | Result |
| --- | --- |
| Hydroxyl No. mg. KOH/g. | 433 |
| Volatiles, weight % | 0.8 |
| Water, weight % | 0.035 |
| Acid No. mg. KOH/g. | 0.37 |
| pH (10:6:isopropanol:$H_2O$) | 6.2 |

Four polyurethane foams, identified as Examples 1, 2, 3 and 4 respectively, were prepared from the above polyether using the following formulation:

| Example | Formulation, parts | | | |
| --- | --- | --- | --- | --- |
|  | 1 | 2 | 3 | 4 |
| Polyether | 100 | 100 | 100 | 100 |
| Trichlorofluoromethane | 45 | 35 | 25 | 15 |
| Dimethylethanolamine | 1.5 | 1.5 | 1.5 | 1.5 |
| PAPI[3] | 111 | 111 | 111 | 111 |
| Silicone surfactant (SF 1066)[4] | 2.0 | 2.0 | 2.0 | 2.0 |

[3]Trademark of Upjohn Company for their brand of polyphenyl-dimethylene-triisocyanate.
[4]Trademark of General Electric Company for silicon surfactant.

Foams were prepared from these formulations, allowed to cure, and analyzed. Properties of the foams are as follows:

| Example | 1 | 2 | 3 | 4 |
| --- | --- | --- | --- | --- |
| Density, core pcf | 1.59 | 1.83 | 2.59 | 4.07 |
| Compressive Strength, psi | | | | |
| Parallel | 12 | 20 | 34 | 64 |
| Perpendicular | 8 | 13 | 22 | 47 |
| Porosity, % open-cell | 95 | 87 | 91 | 72 |
| Flame Test: ASTM-1692 | NB[1] | SE[2] | SE[2] | NB[1] |
| Humid Age, % Δ V 158° F, 100% RH | | | | |
| 1 day | 2 | 0 | 2 | 3 |
| 2 days | 2 | 0 | 2 | 2 |
| 7 days | 2 | 1 | 0 | −2 |
| 14 days | 2 | −1 | 2 | 0 |
| 28 days | 2 | −3 | 1 | 0 |

[1]Non-burning
[2]Self-extinguishing

EXAMPLE 5

Into a reaction flask, 116 grams of 85 percent standard grade, and 470 grams of 105 percent phosphoric acids were charged. Then 270 grams of starch were added into the mixture at room temperature and the system was heated up to 95° C. The second portion of starch (270 grams) was then added maintaining the temperature at 90° C. After a half-hour mixing period at 90°–95° C., the ethylene oxide addition was initiated. The reaction was completed when no more ethylene oxide was consumed (2,870 grams of ethylene oxide were added). After one hour post reaction the volatiles were removed at 75° C. and 2 mm. for 2 hours.

ANALYSIS OF POLYETHER

| Property | Value |
| --- | --- |
| Hydroxyl Number | 429 |
| Acid Number | 0.0 |
| pH | 4.7 |
| % Phosphorus | 4.5 |
| % Starch | 13.0 |
| Viscosity, cps at 28°C. | 1.100 |

A foam was prepared from this polyether using the formulation in which 100 parts of the polyether, 32 parts of trichlorofluoromethane, 2.0 parts of dimethylethanolamine, 2.0 parts of blocked silicon surfactant (Dow Corning's DC-201) and 109 parts of PAPI brand of polyisocyanate were reacted to form a rigid polyurethane foam. After curing the foam, analysis showed it to have the following properties:

| Property | Value |
| --- | --- |
| Density(core—box), pcf | 2.06 |
| Compressive strength psi parallel | 17 |
| Porosity, % open-cell | 95–98 |
| K factor | 0.27 |
| Flame Test ASTM–1692–59T | S.E. |
| Humid Age, % Δ V 158°F, 100% RH 7 days | −1.0 |
| Low Temp. Age, % Δ V −20°F. 7 days | 0 |
| Dry Heat Age, % Δ V 158°F. 7 days | <1 |

EXAMPLE 6

Into a reaction flask, 58 grams of 85 percent standard grade, and 235 grams of 105 percent phosphoric acids were charged. Then 225 grams of starch were added into the mixture at room temperature and the system was heated up to 100° C. The second portion of starch (225 grams) was then added maintaining the temperature at 90° C. After a half-hour mixing period at 90°–95° C., the ethylene oxide addition was initiated. The reaction was completed when no more ethylene oxide was consumed (1,857 grams of ethylene oxide were added). After one hour post reaction the volatiles were removed at 80° C. and 1 mm. for 1 hour.

ANALYSIS OF POLYETHER

| Property | Value |
| --- | --- |
| Hydroxyl Number | 466 |
| Acid Number | 0.3 |
| pH | 4.7 |
| % Phosphorus | 3.6 |
| % Starch | 17.4 |

A polyurethane foam was prepared in a manner similar to Example 5, and the resulting foam was flame retardant and substantially all open-cell.

EXAMPLE 7

Foams prepared in accordance with the procedure of Example 5 were cut into sections 12 inches × 12 inches × 1 foot thick and sufficient panels were secured together to form an 8 foot × 9 foot wall section. Sound absorption tests were conducted upon the panels using test signals having a wide range of frequencies. The panel section was found to have very good sound absorption properties.

Various modifications of the invention, some of which have been referred to above, may be employed without departing from the spirit of the invention.

What is desired to be secured by Letters Patent and claimed is:

1. A substantially open-cell polyurethane foam prepared by reacting a starch-phosphorus-based polyether with an organic polyisocyanate in the presence of a foaming agent and a reaction catalyst, said polyether being prepared by
   a. admixing starch with phosphoric acid containing between about 80 and 120% by weight of phosphoric acid,
      1. the proportion of phosphoric acid being equivalent to between about 1 and about 10 moles of $P_2O_5$ equivalents in said phosphoric acid per glucose unit weight of starch,
   b. reacting the resulting mixture with ethylene oxide at a temperature in the range between about 30° and 120° C.,
      1. the proportion of said ethylene oxide being sufficient to form a polyether having a hydroxyl number between about 30 and about 800, and
   c. recovering the resulting starch-phosphorus-based polyether produced thereby.

2. The polyurethane foam of claim 1 wherein said starch is selected from the group consisting of potato starch, corn starch and mixtures thereof.

3. The polyurethane foam of claim 2 wherein the proportion of said phosphoric acid is equivalent to between about 1.5 and about 3 moles of $P_2O_5$ equivalents in said phosphoric acid per glucose unit weight of starch.

4. The polyurethane foam of claim 3 wherein said phosphoric acid has a concentration of about 100% by weight of $H_3PO_4$.

5. The polyurethane foam of claim 3 wherein said polyether has a hydroxyl number of between about 300 and 800.

6. The polyurethane foam of claim 2 wherein the proportion of ethylene oxide is equivalent to between about 0.9 and about 3.5 moles of ethylene oxide per mole of hydroxyl radicals present in said mixture, and prior to recovering said polyether, there are added to the resulting mixture
   d. a catalytic proportion of an acid catalyst,
   e. additional starch in a proportion less than that effective for solidification of the reaction mixture and,
   f. additional ethylene oxide equivalent to between about 0.9 and about 3.5 moles of ethylene oxide per mole of hydroxyl radical present in the reaction mixture.

* * * * *